US012036547B1

(12) United States Patent
Schwab et al.

(10) Patent No.: US 12,036,547 B1
(45) Date of Patent: Jul. 16, 2024

(54) LIQUID SAMPLE HOLDING ASSEMBLY

(71) Applicant: UrynX, LLC, East Chatham, NY (US)

(72) Inventors: Brian Schwab, East Chatham, NY (US); Kenneth M. Kernen, Troy, MI (US); Matthew Neururer, East Chatham, NY (US)

(73) Assignee: UrynX, LLC, East Chatham, NY (US)

( * ) Notice: Subject to any disclaimer, the term of this patent is extended or adjusted under 35 U.S.C. 154(b) by 0 days.

(21) Appl. No.: 18/471,109

(22) Filed: Sep. 20, 2023

Related U.S. Application Data

(60) Provisional application No. 63/408,213, filed on Sep. 20, 2022.

(51) Int. Cl.
*B01L 3/00* (2006.01)

(52) U.S. Cl.
CPC ......... *B01L 3/5023* (2013.01); *B01L 3/50825* (2013.01); *B01L 2200/087* (2013.01); *B01L 2300/042* (2013.01); *B01L 2300/069* (2013.01); *B01L 2300/0825* (2013.01)

(58) Field of Classification Search
CPC ............... B01L 3/5023; B01L 3/50825; B01L 2200/087; B01L 2300/042; B01L 2300/069; B01L 2300/0825
See application file for complete search history.

(56) References Cited

U.S. PATENT DOCUMENTS

2002/0046614 A1* 4/2002 Alley ...................... B01L 3/502 73/864.51
2003/0172446 A1* 9/2003 Jones ................ A61B 10/0096 4/144.1
2006/0029517 A1* 2/2006 Hartselle ................ B01L 3/502 422/400

* cited by examiner

*Primary Examiner* — Dennis White
(74) *Attorney, Agent, or Firm* — Michael D. Eisenberg

(57) ABSTRACT

An assembly for holding a liquid sample, the assembly comprising a cup for holding a liquid and a chamber assembly, The chamber assembly comprises: a cap configured to be removably joined to the cup and to close the cup when joined to the cup; a chamber joined to the cap and having an open top end above the cap, the chamber traversing the cap and extending from the open top end to a bottom end below the cap, such that when the cap is joined to the cup, the bottom end of chamber is located inside the cup, the first chamber having at least one perforation at or near the bottom end; a chamber cap configured to be joined to the open top end of the chamber and to close the chamber when joined to the chamber.

13 Claims, 23 Drawing Sheets

300

300

110

LIQUID SAMPLE HOLDING ASSEMBLY

CROSS-REFERENCE TO RELATED APPLICATIONS

This application claims priority from U.S. Provisional Application Ser. No. 63/408,213 filed on Sep. 20, 2022, which is hereby incorporated herein by reference in its entirety.

TECHNICAL FIELD

This invention relates to medical devices for holding liquid samples for analysis.

BACKGROUND OF THE INVENTION

The spread of pandemics (COVID-19) and migration patterns where people are increasingly moving to exurban locations are factors which impose difficulties in obtaining biological samples or specimens for diagnostic testing. The contagiousness of COVID-19 has necessitated people to isolate from others. Diagnostic testing is needed which can use facilely obtained biological samples, while minimizing the risk of spreading pandemics (i.e., increasing safety when obtaining biological samples or specimens and efficiency for diagnostic testing). Exurban locations often lack the facilities for rapid, efficient, and safe diagnostic testing.

BRIEF SUMMARY OF EMBODIMENTS OF THE INVENTION

An aspect of some embodiments of the present invention relates to an assembly for holding a liquid sample, the assembly comprising a cup for holding a liquid and a chamber assembly. The chamber assembly includes a cap, a chamber, and a chamber cap. The cap is configured to be removably joined to the cup and to close the cup when joined to the cup. The chamber is joined to the cap and has an open top end above the cap, the chamber traversing the cap and extending from the open top end to a bottom end below the cap, such that when the cap is joined to the cup, the bottom end of chamber is located inside the cup, the first chamber having at least one perforation at or near the bottom end. The chamber cap is configured to be joined to the open top end of the chamber and to close the chamber when joined to the chamber.

In a variant, the cup has a ridge at least partially surrounding an outer surface thereof below a rim of the cup, and the assembly further comprises a handle. The handle comprises a rod and a gripper. The rod is configured to be held by a user, the rod extending between a proximal end and a distal end. The gripper is joined to the proximal end of the rod and shaped to be traversed by a portion of the cup below the ridge and to abut the ridge from below the ridge, such that the gripper supports the cup by supporting the ridge, thereby enabling handling of the cup via the handle.

The gripper may be a loop.

In another variant, the cup has first threads, while the cap has second threads configured to cooperate with the first threads. The cap is configured to be joined to the cup by being screwed onto the cup so the first threads and the second threads cooperate.

In yet another variant, the cap seals the cup when joined to the cup.

In a further variant, the chamber cap seals the chamber when joined to the chamber.

In yet a further variant, the assembly further includes a test strip configured to be placed inside the chamber, such that the test strip is completely held within the chamber when the chamber is closed by the chamber cap.

The liquid may be urine and the test strip may a urine test strip.

Another aspect of some embodiments of the present invention relates to a method for testing a liquid, the method comprising: providing the above-described assembly; depositing the liquid in the cup; closing the cup with the cap; removing the chamber cup from the chamber; placing a test strip in the chamber; closing the chamber with the chamber cap while the test strip is in the chamber; tilting the cup, to introduce the liquid from the cup into the chamber via the at least one perforation; orienting the cup upright; removing the chamber cup from the chamber; removing the test strip.

In a variant, the method further comprises, after the removing of the test strip, analyzing the strip.

In another variant, the cup has a ridge surrounding an outer surface thereof below a rim of the cup, and the assembly comprises a handle. The handle comprises a rod and a gripper. The rod is configured to be held by a user, the rod extending between a proximal end and a distal end. The gripper is joined to the proximal end of the rod and shaped to be traversed by a portion of the cup below the ridge and to abut the ridge from below the ridge, such that the gripper supports the cup by supporting the ridge, thereby enabling handling of the cup via the handle. Before the depositing of the liquid in the cup, the method comprises: placing the cup through the gripper, such that the gripper abuts the ridge from below; maneuvering the cup by holding and moving the rod.

In another variant, the liquid is urine and the test strip is a urine test strip.

A further aspect of some embodiments of the present invention relates to an assembly for holding a liquid sample, the assembly comprising a cup, a chamber assembly, a handle, and a test strip. The cup is configured for holding a liquid, and has a ridge at least partially surrounding an outer surface thereof below a rim of the cup. The chamber assembly includes a cap, a chamber, and a chamber cap. The cap is configured to be removably joined to the cup and to close the cup when joined to the cup. The chamber is joined to the cap and having an open top end above the cap, the chamber traversing the cap and extending from the open top end to a bottom end below the cap, such that when the cap is joined to the cup, the bottom end of chamber is located inside the cup, the first chamber having at least one perforation at or near the bottom end. The chamber cap is configured to be joined to the open top end of the chamber and to close the chamber when joined to the chamber. The handle comprises a rod and a gripper. The rod is configured to be held by a user, the rod extending between a proximal end and a distal end. The gripper joined to the proximal end of the rod and shaped to be traversed by a portion of the cup below the ridge and to abut the ridge from below the ridge, such that the gripper supports the cup by supporting the ridge, thereby enabling handling of the cup via the handle. The test strip is configured to be placed inside the chamber, such that the test strip is completely held within the chamber when the chamber is closed by the chamber cap.

In a variant, the liquid is urine and the test strip is a urine test strip.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

Figure 1:
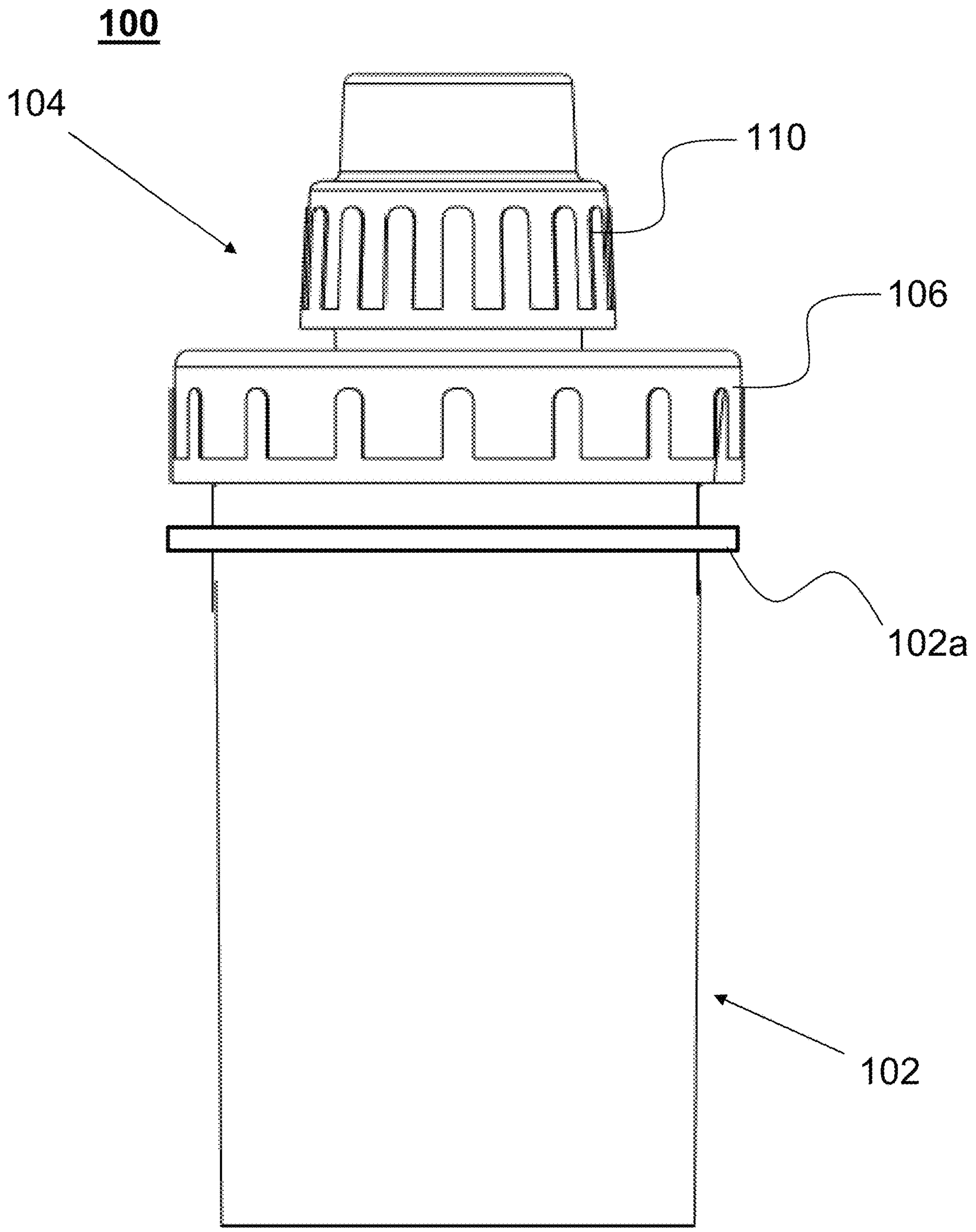
FIG. 1 is a side view of a liquid holding assembly, according to some embodiments of the present invention.
Figure 2:
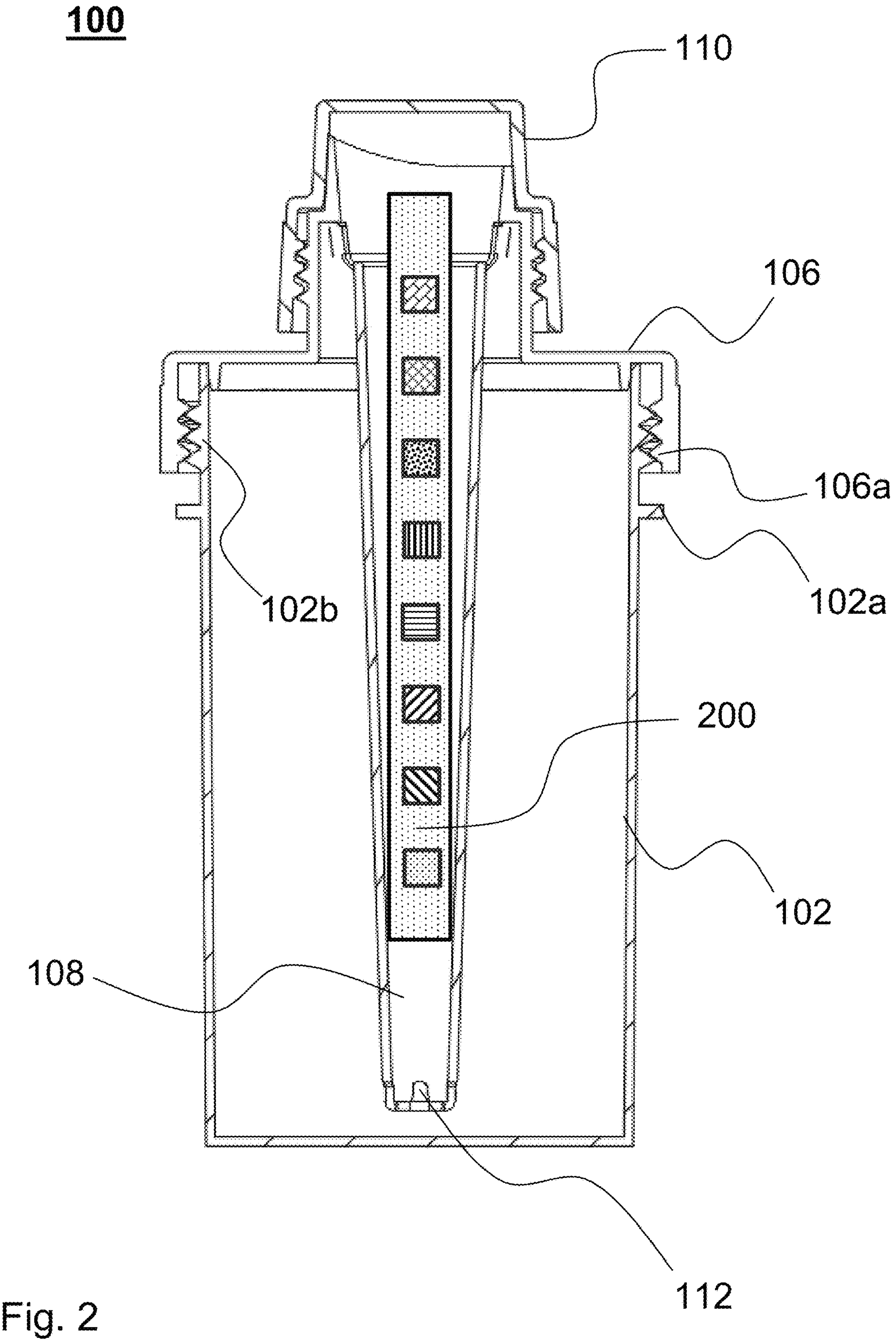
FIG. 2 is a side cross-sectional view of the liquid holding assembly of FIG. 1.
Figure 5:
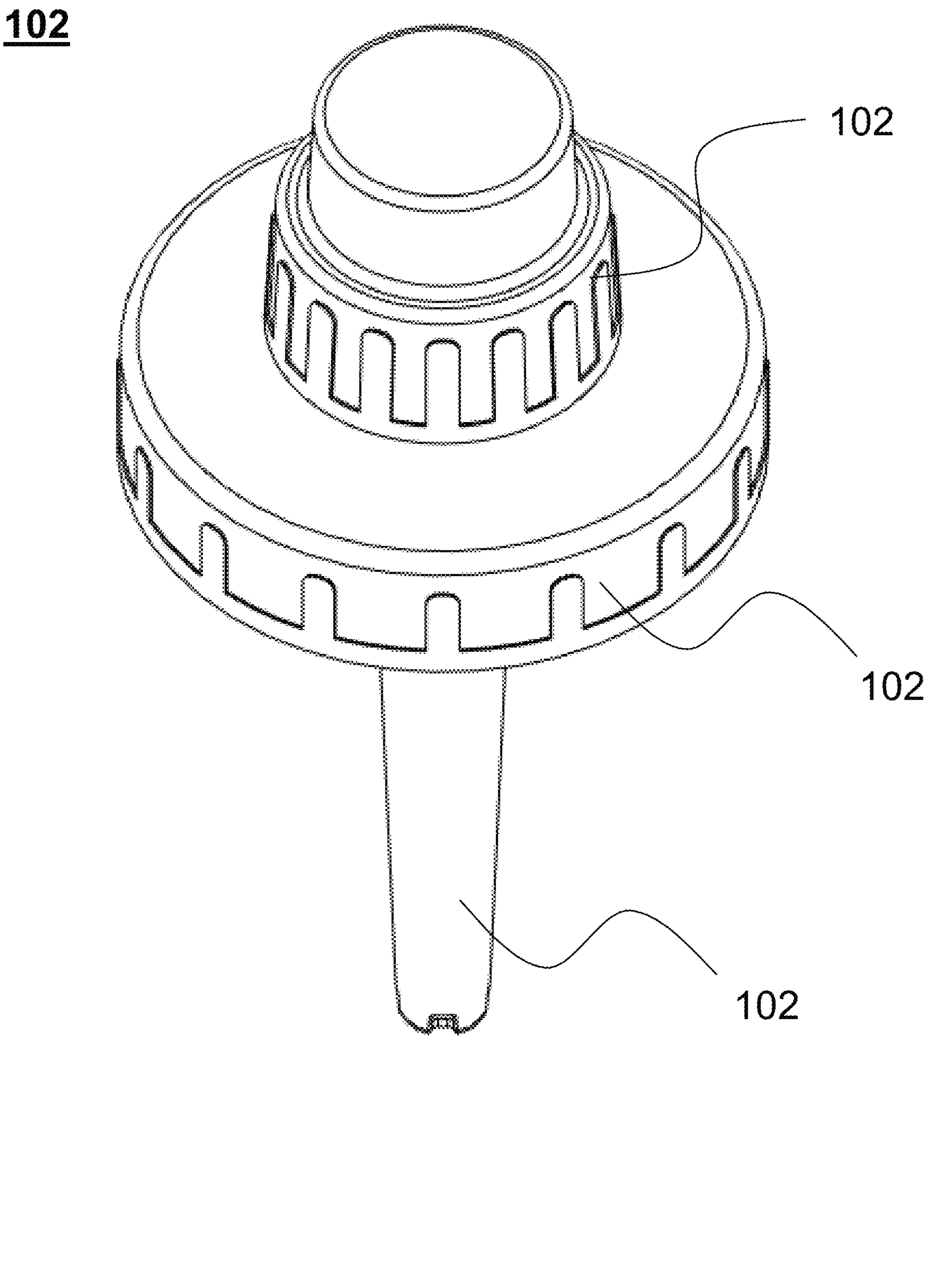
FIGS. 5-7 illustrate different views of a chamber assembly of the liquid holding assembly, according to some embodiments to the present invention.
Figure 6:
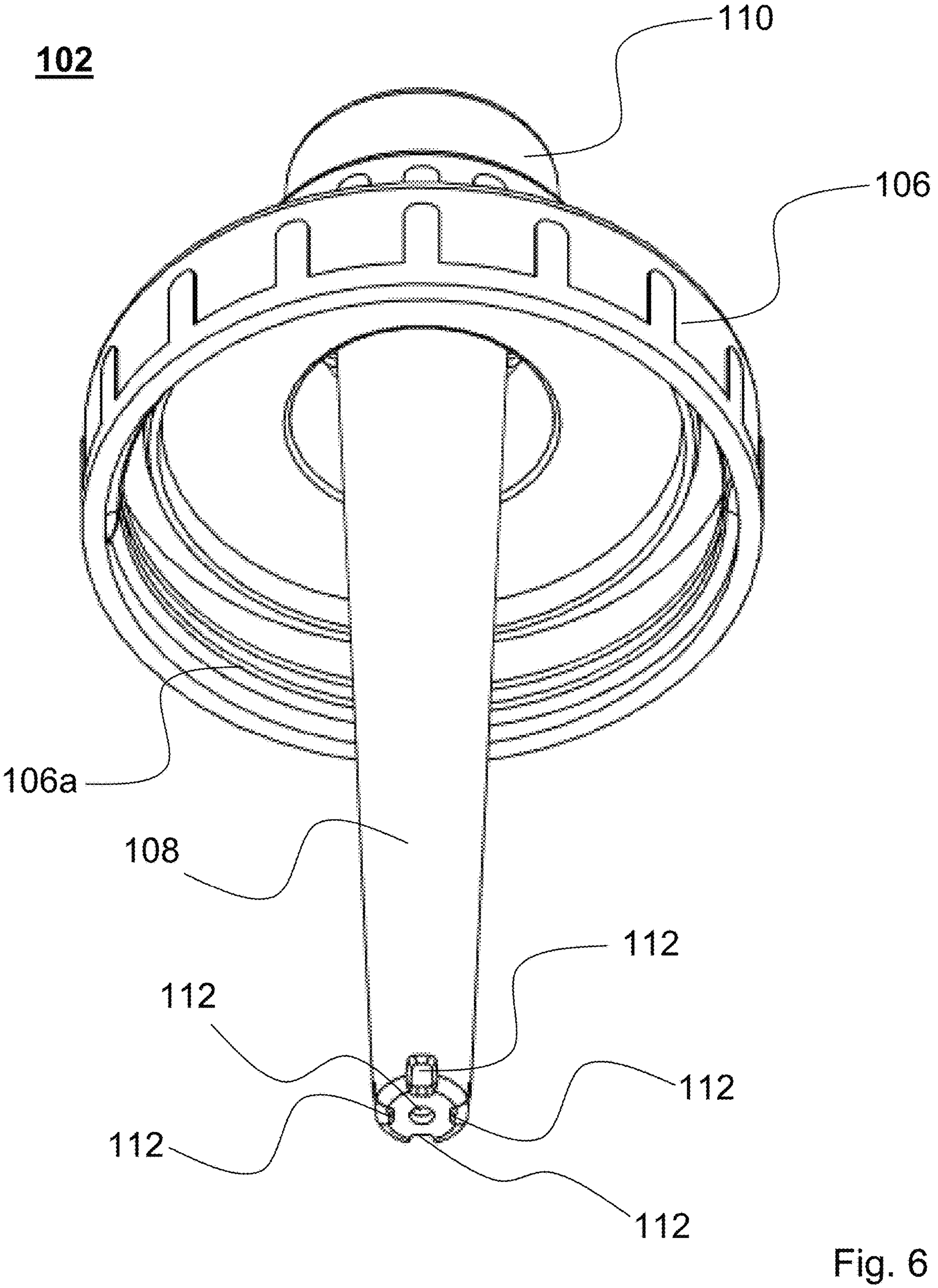
Figure 7:
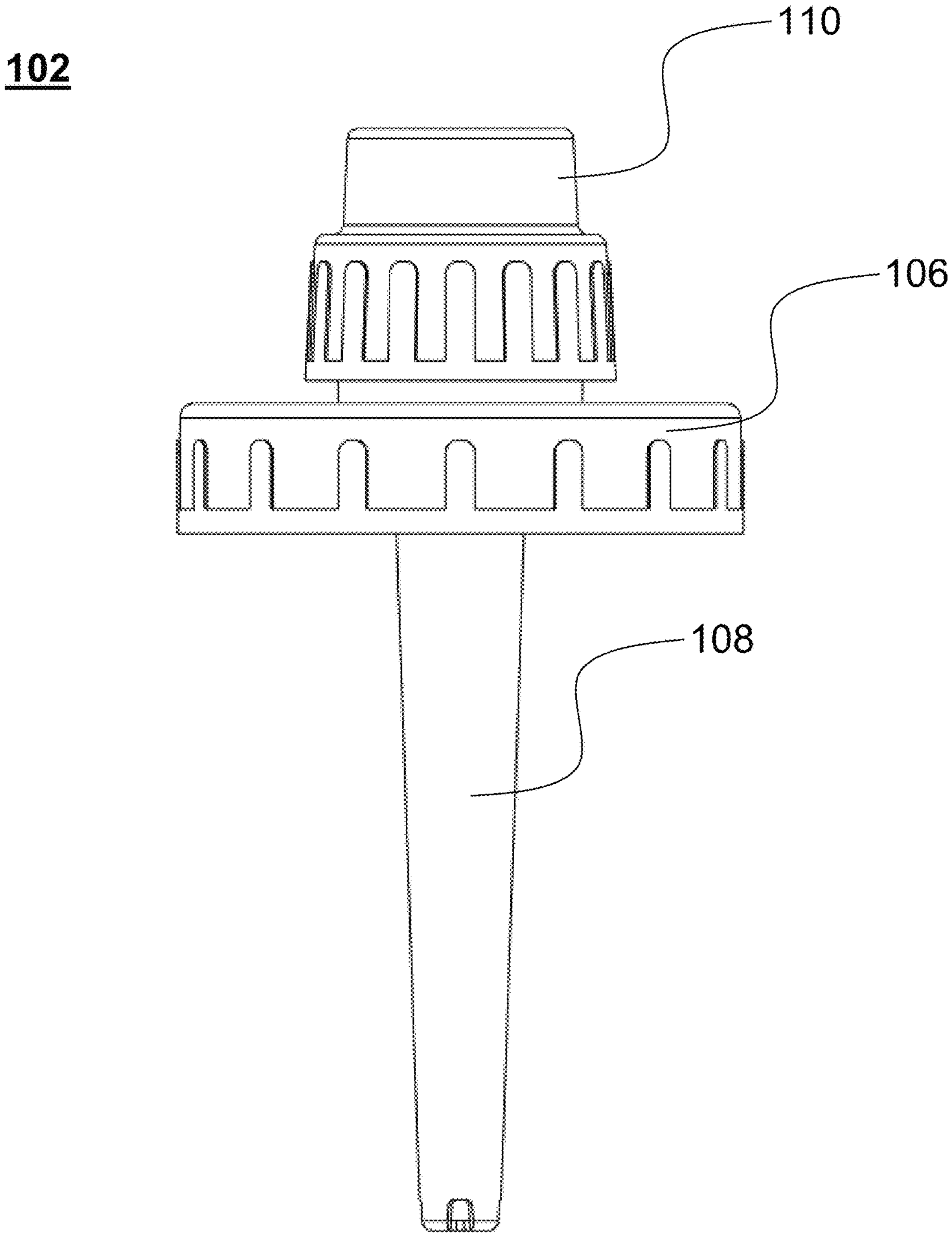
Figure 11:
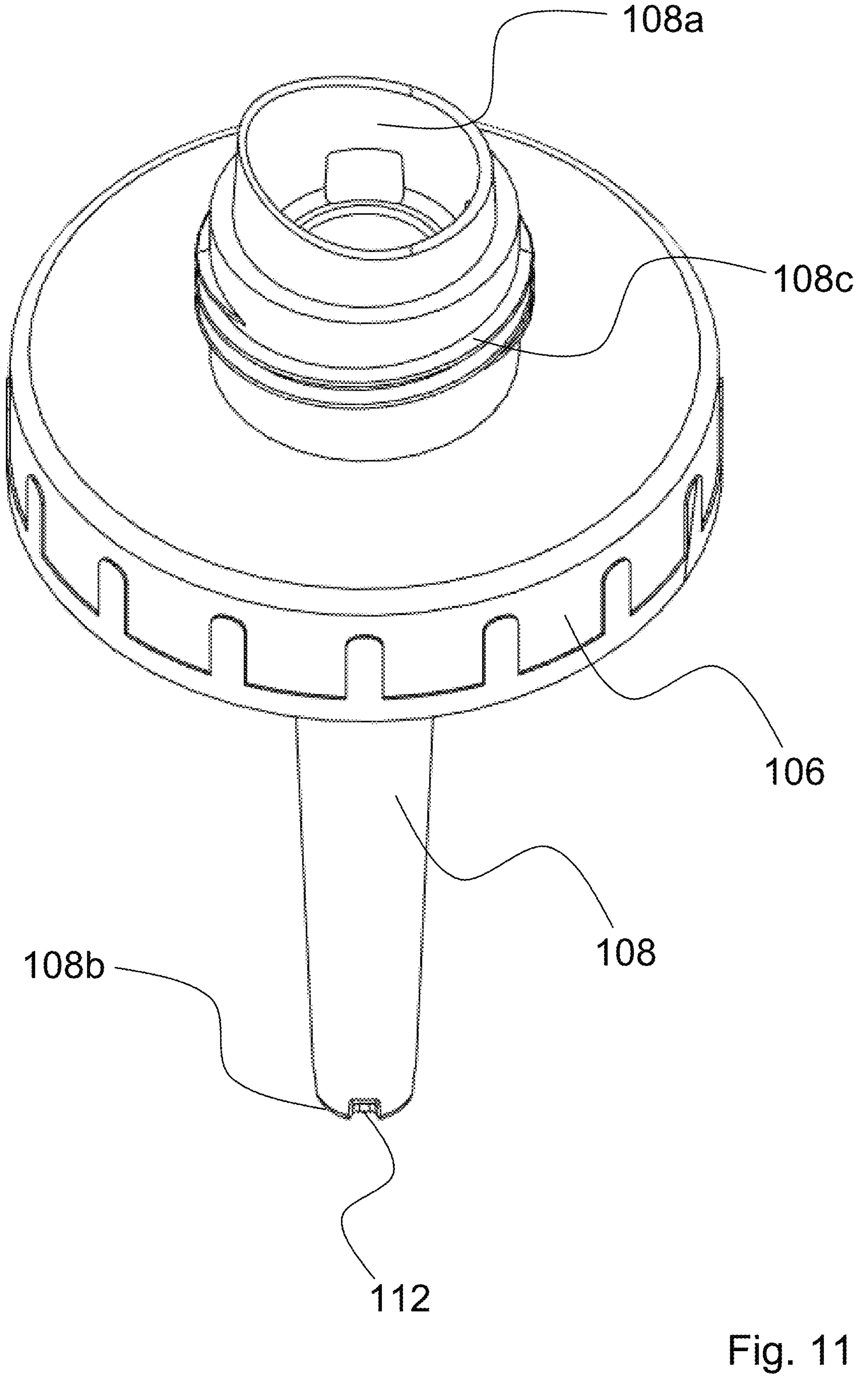
FIGS. 11 and 12 illustrate a chamber assembly without a chamber cup, according to some embodiments of the present invention.
Figure 12:
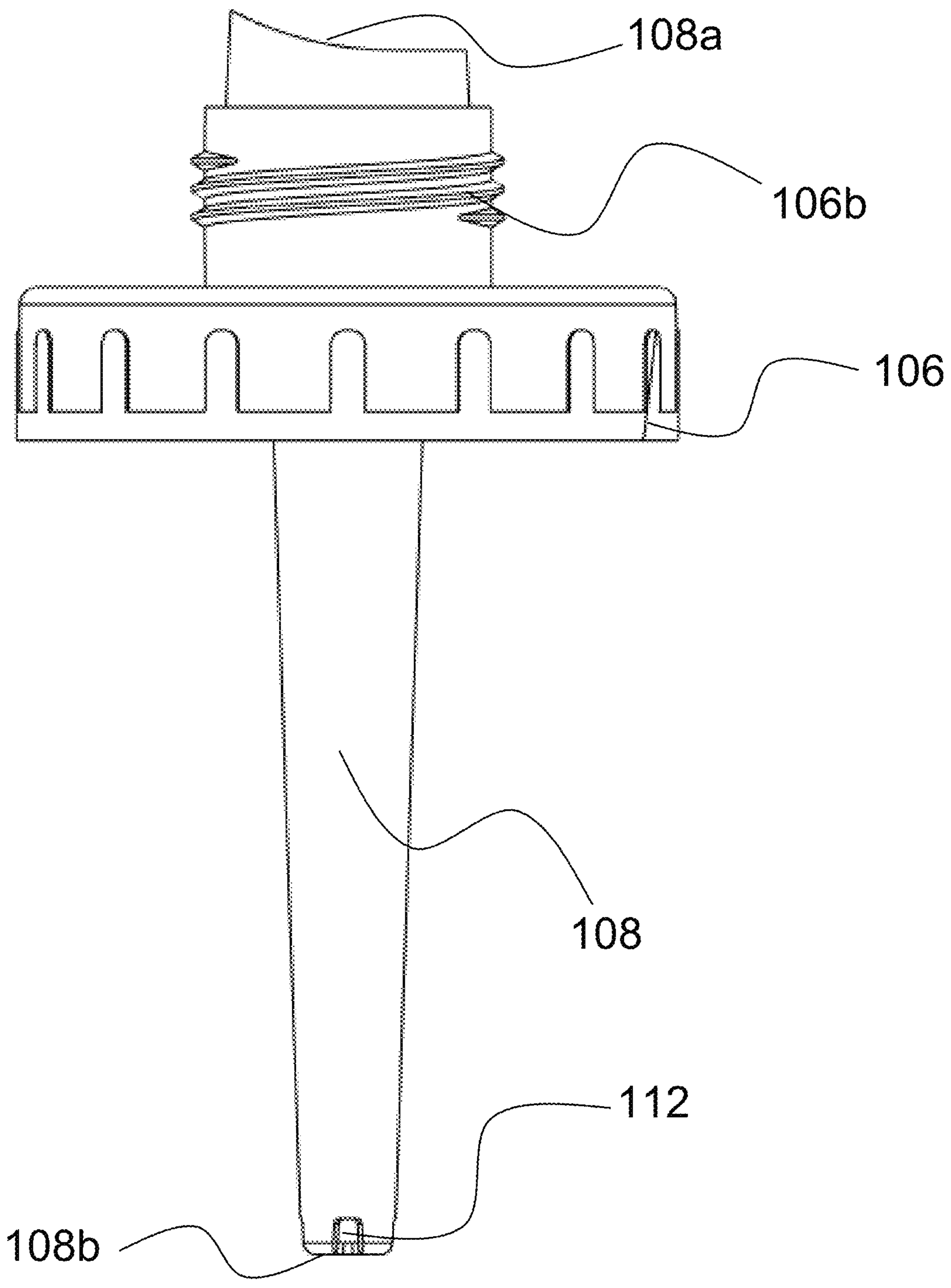
Figure 13:
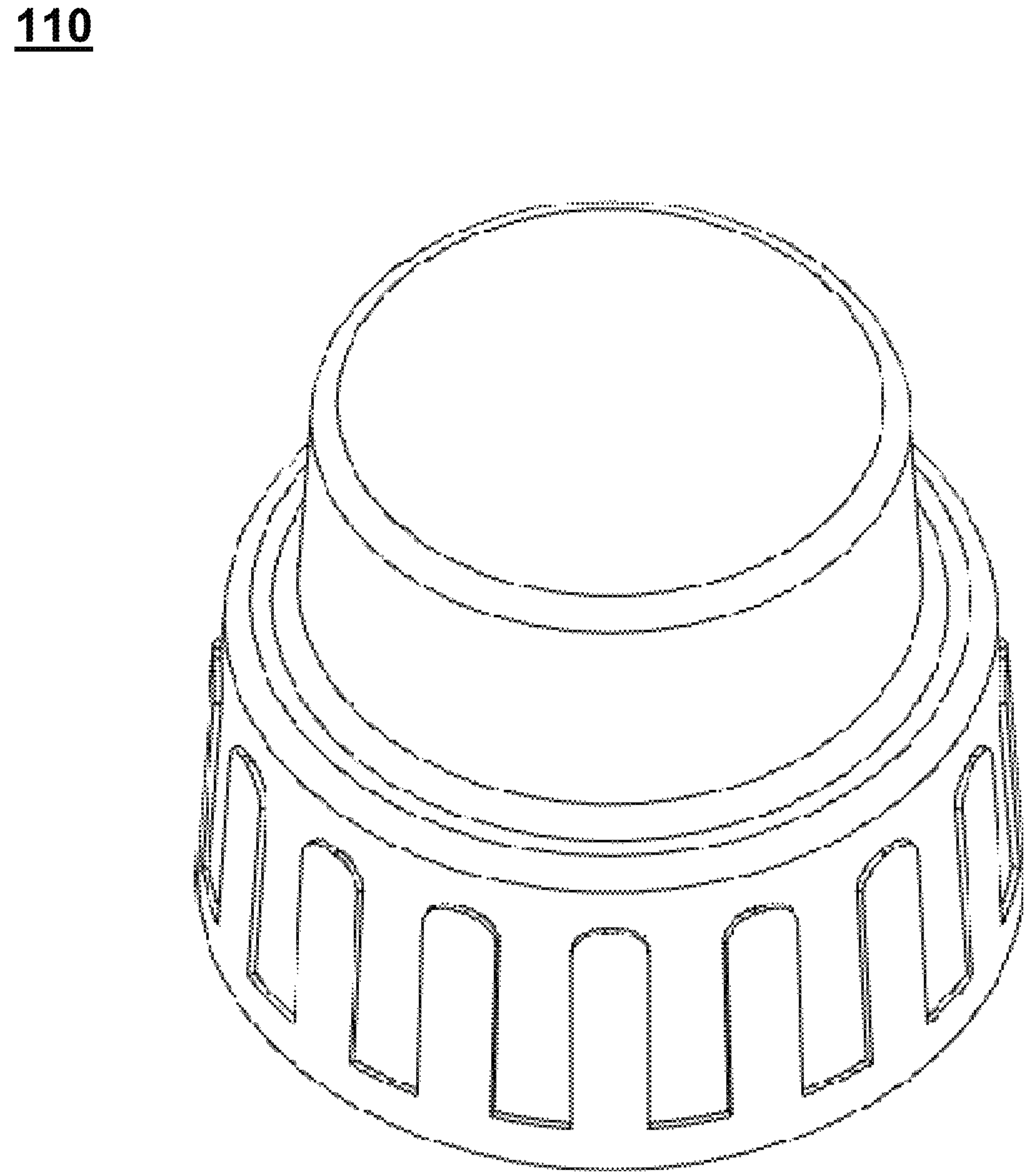
FIGS. 13-15 illustrate a chamber cup, according to some embodiments of the present invention.
Figure 14:
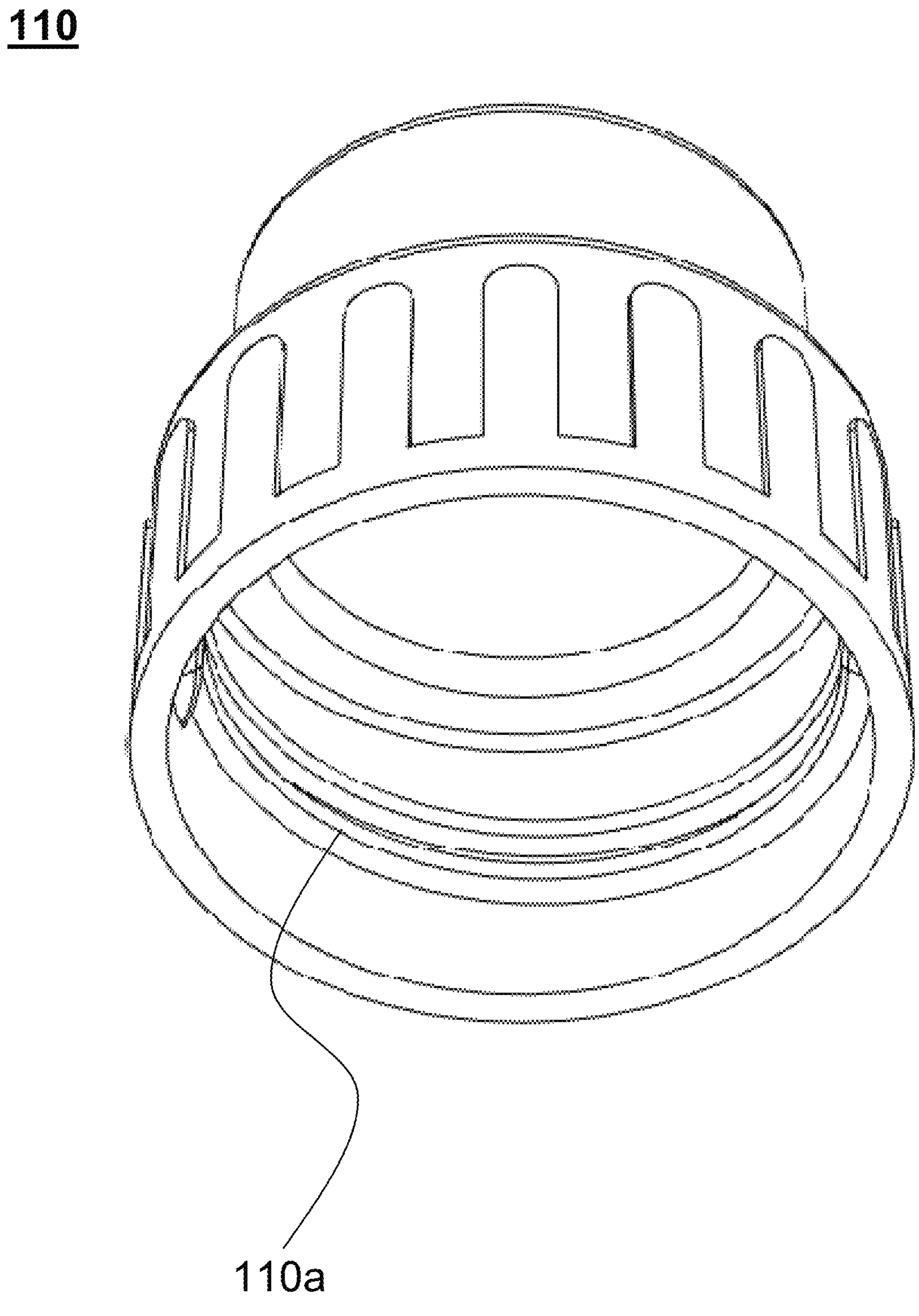
Figure 15:
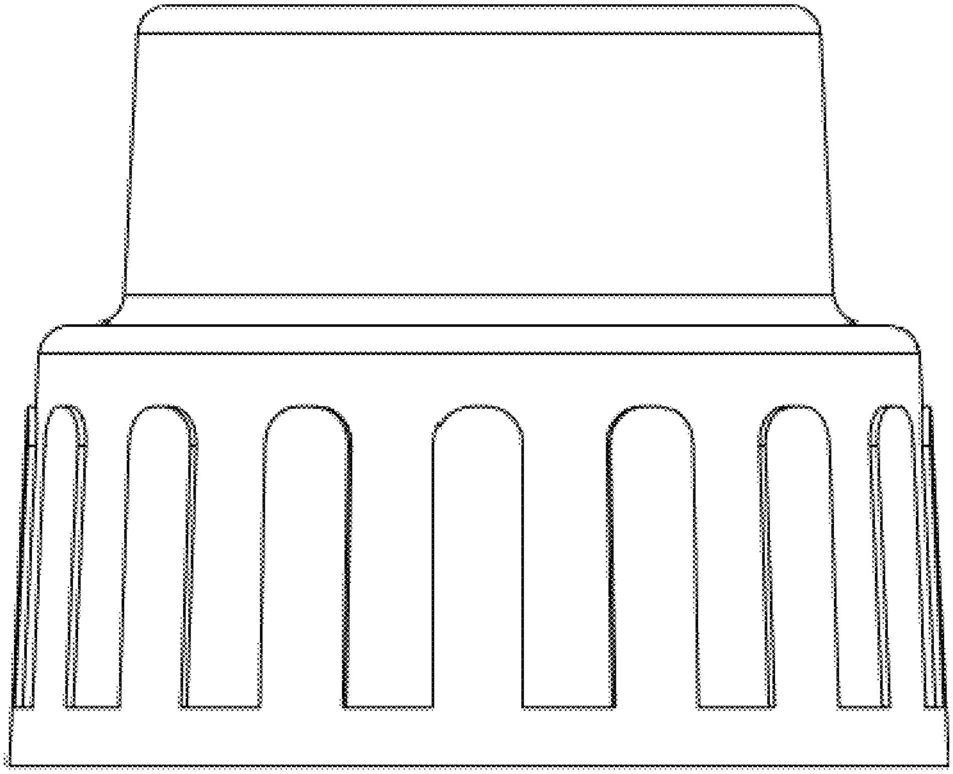

Referring now to the drawings, FIG. 1 is a side view of a liquid holding assembly, according to some embodiments of the present invention. FIG. 2 is a side cross-sectional view of the liquid holding assembly of FIG. 1. FIGS. 5-7 illustrate different views of a chamber assembly of the liquid holding assembly, according to some embodiments to the present invention. FIGS. 11 and 12 illustrate a chamber assembly without a chamber cup, according to some embodiments of the present invention. FIGS. 13-15 illustrate a chamber cup, according to some embodiments of the present invention.

The assembly 100 includes a cup 102 and a chamber assembly 104. The cup 102 is configured to hold a liquid. The chamber assembly 104 includes a cap 106, a chamber 108, and a chamber cap 110. The cap 106 is configured to be removably joined to the cup 102 and to close the cup 102 when joined to the cup 102. The chamber 108 is joined to the cap 106 and has an open top end 108*a* above the cap 106. The chamber 108 traverses the cap 106 and extends from the open top end 108*a* to a bottom end 108*b* below the cap 106. When the cap 106 is joined to the cup 102, the bottom end 108*b* of the chamber 108 is located inside the cup 102. The chamber 108*a* has at least one perforation 112 at or near the bottom end 108*b*.

The chamber cap 110 is configured to be joined to the open top end 108*a* of the chamber 108 and to close the chamber 108 when joined to the chamber 108.

In some embodiments of the present invention, the cup 102 has a ridge 102*a* at least partially surrounding an outer surface thereof below a rim of the cup.

In a variant, the cup 102 has first threads 102*b*, while the cap has second threads 106*a* configured to cooperate with the first threads 102*b*. The cap 106 is configured to be joined to the cup 102 by being screwed onto the cup 102 so the first threads 102*b* and the second threads 106*b* cooperate.

In a variant, the cap 106 seals the cup 102 when joined to the cup. The chamber cap 110 optionally seals the chamber 108 when joined to the chamber 108. In this manner, the assembly liquid holding 100 can be rotated and oriented upside down, such that liquid from the cup enters the chamber 108 via the perforation(s) 112, but does not leak out of the assembly 100.

In some embodiments of the present invention, the chamber cap 110 has threads 110*a*, while the chamber 108 has top threads 108*c* on the top section of the chamber 108, between the top end 108*a* and the cap 106. The chamber cap 110 is configured to be joined to the chamber 108 above the cap 106, by being screwed onto the chamber 108 so the threads 110*a* and the top threads 108*c* cooperate.

The chamber assembly is configured to hold a test strip 200 as shown in FIG. 2 inside the chamber 108, such that the test strip 200 is completely held within the chamber 108 when the chamber 108 is closed by the chamber cap 110. In a variant, the assembly 100 is provided as a kit that includes the test strip 200. The test strip 200 includes distinct chemical pads with respective reagents that change color upon physical exposure to the liquid depending on presence of entities in the liquid. In some embodiments of the present invention, the liquid is urine and the test strip is a urine test strip.

Figure 3:
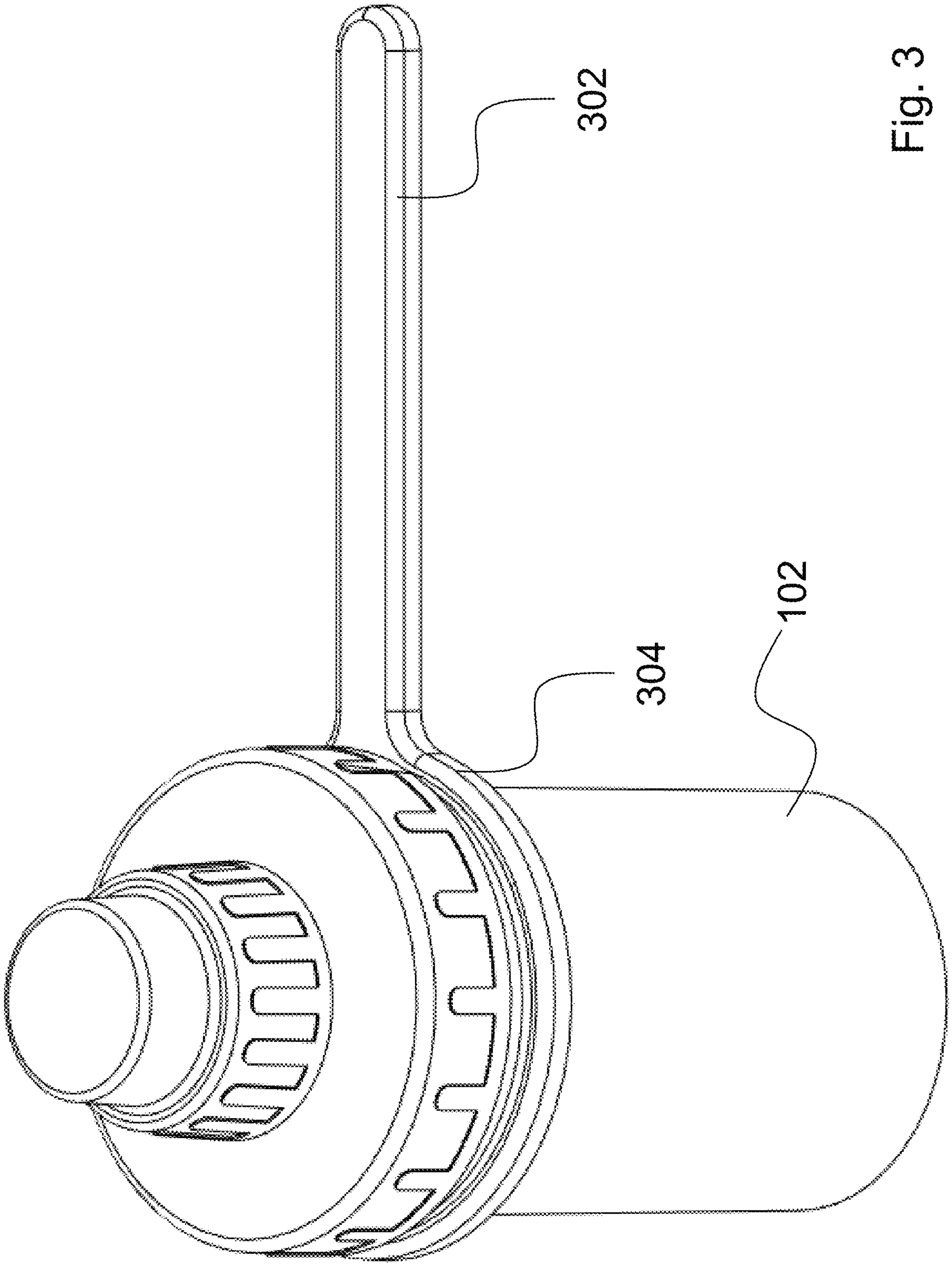
FIG. 3 is a perspective view of a liquid holding assembly with a handle, according to some embodiments of the present invention.
Figure 4:
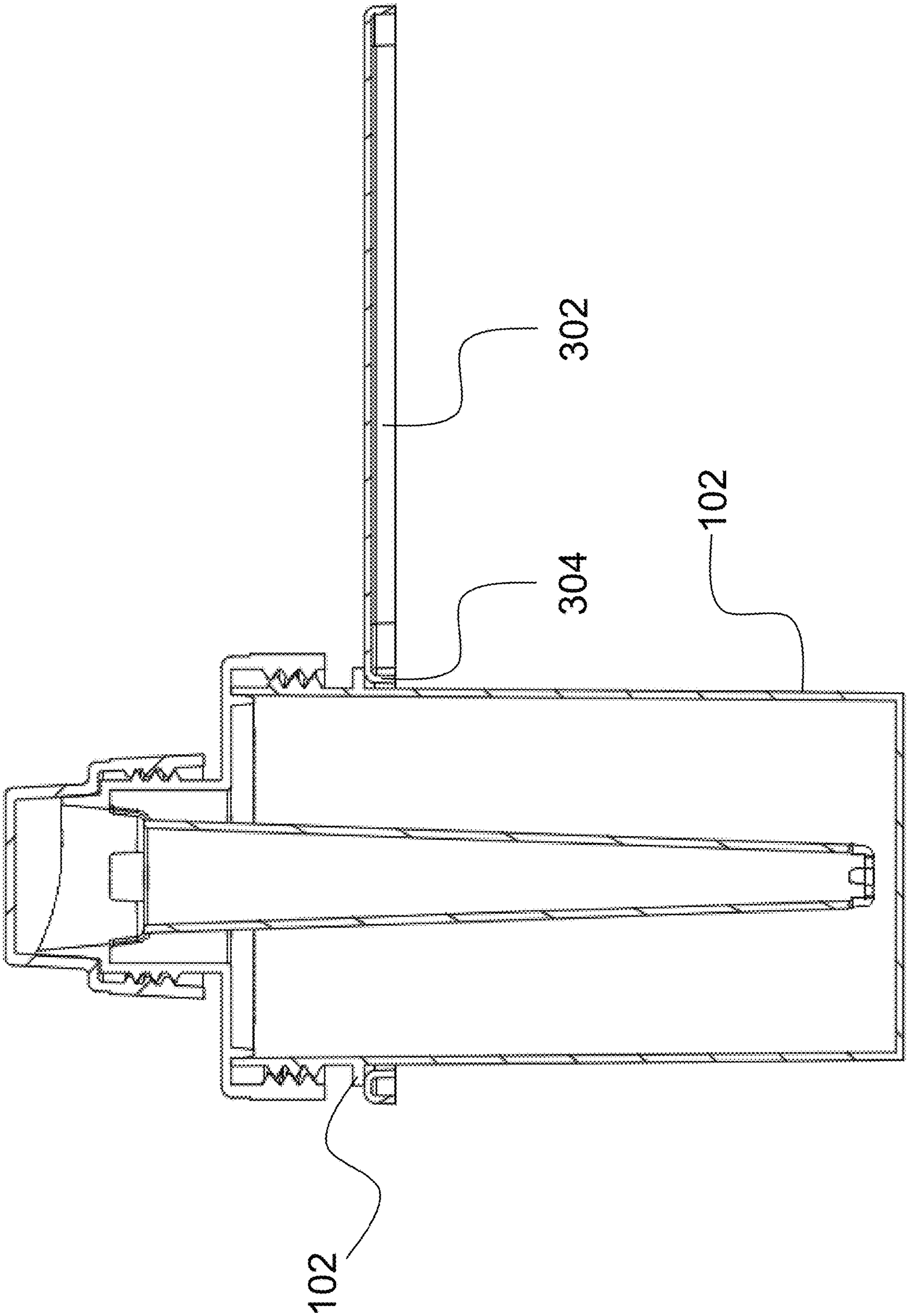
FIG. 4 is a side cross-sectional view of the liquid holding assembly of FIG. 3.
Figure 8:
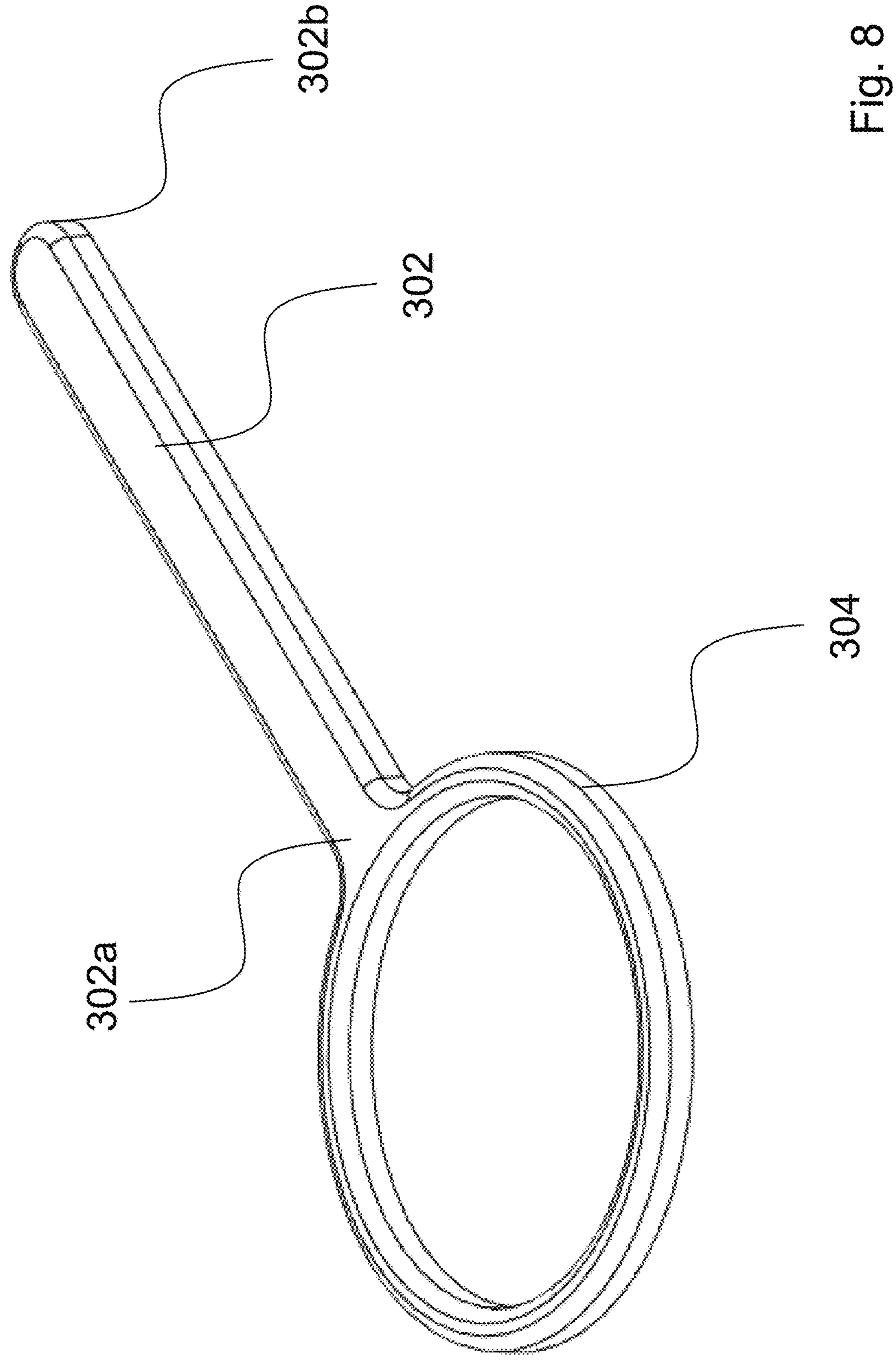
FIGS. 8-10 illustrate examples of the handle for holding the cup of the liquid holding assembly, according to some embodiments to the present invention.
Figure 9:
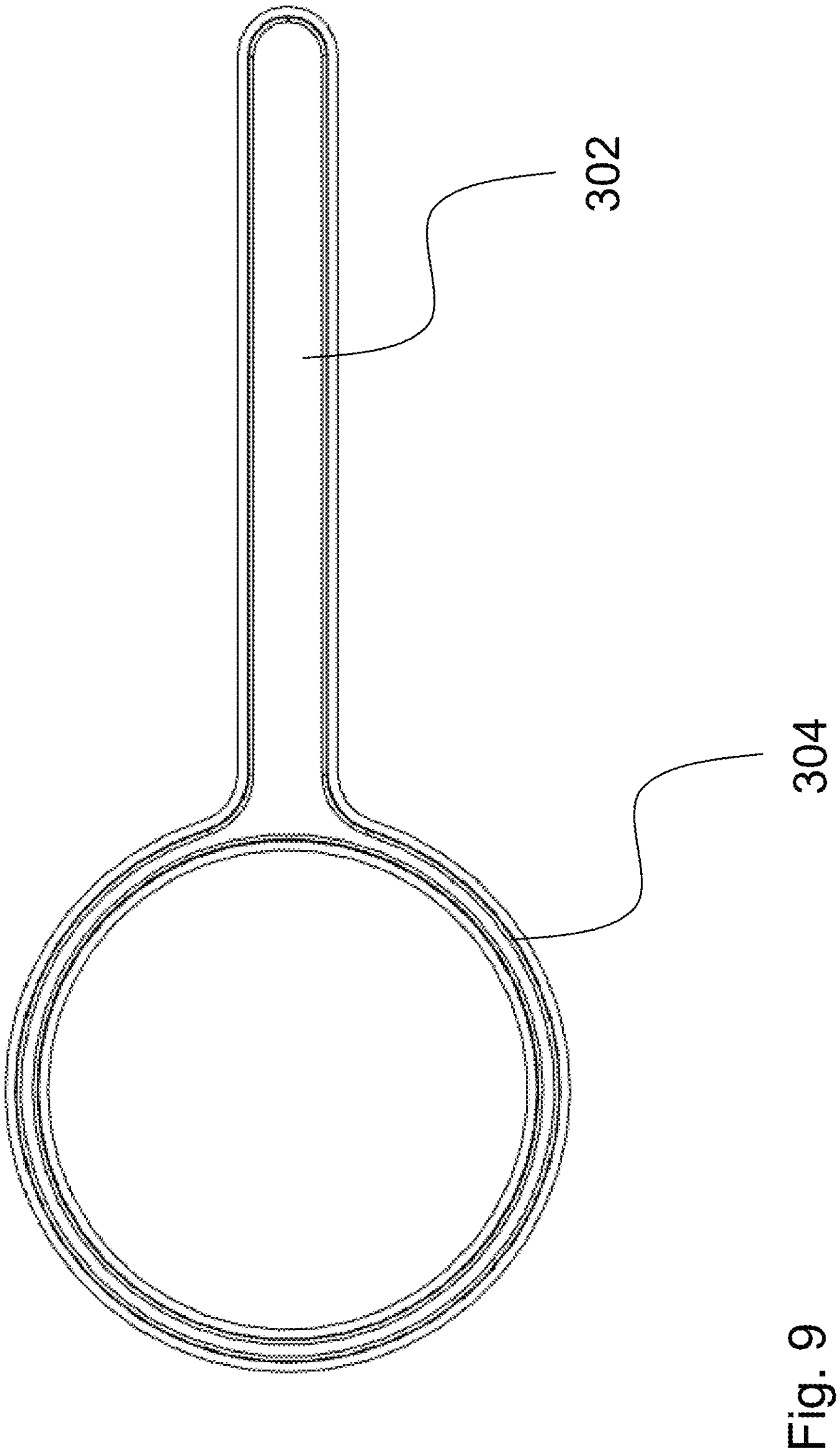
Figure 10:
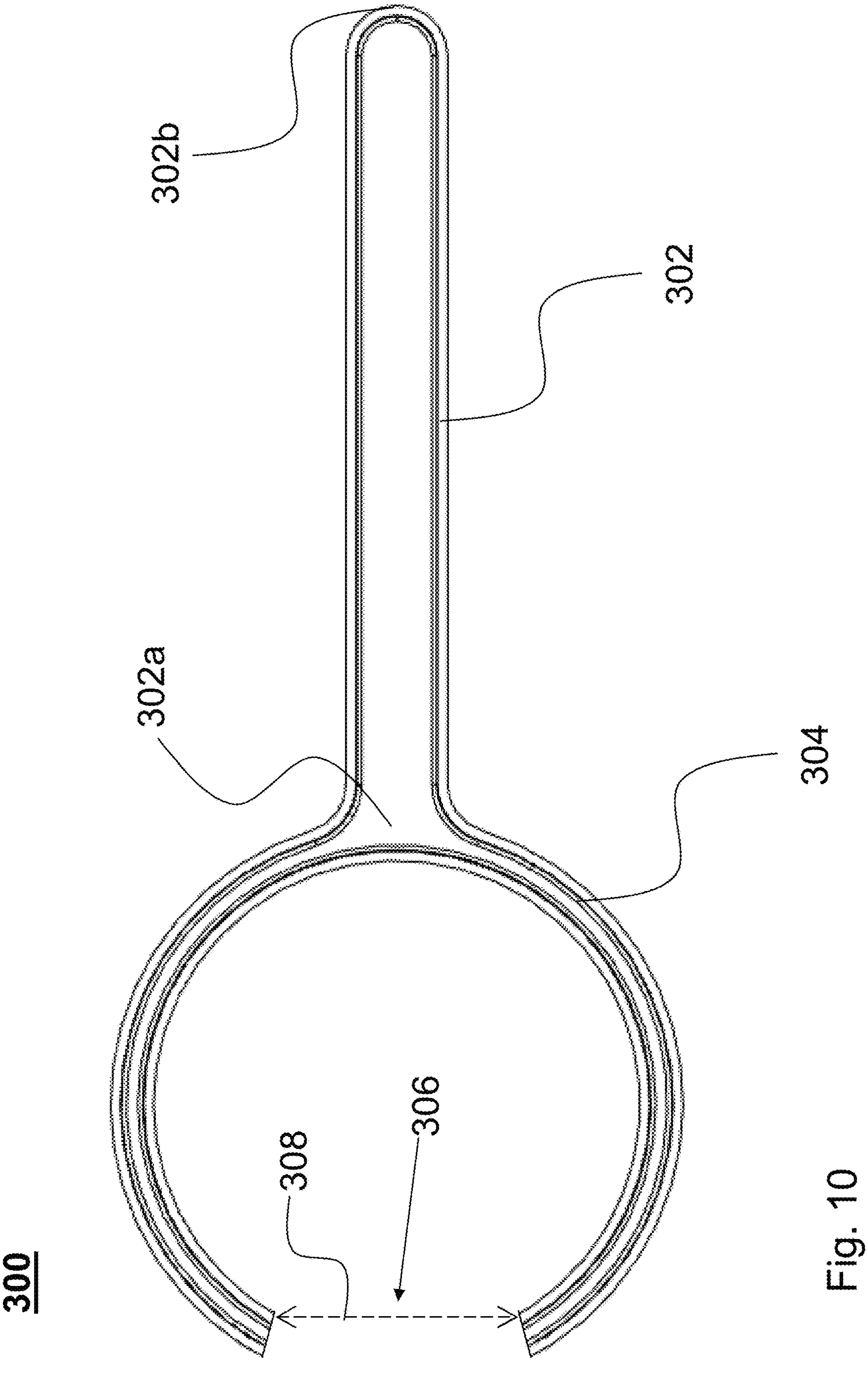

FIG. 3 is a perspective view of a liquid holding assembly with a handle, according to some embodiments of the present invention. FIG. 4 is a side cross-sectional view of the liquid holding assembly of FIG. 3. FIGS. 8-10 illustrate examples of the handle for holding the cup of the liquid holding assembly, according to some embodiments to the present invention.

In some embodiments of the present invention, the cup 102 has a ridge 102*a* at least partially surrounding an outer surface thereof below a rim of the cup. The assembly further includes a handle 300. The handle 300 includes a rod 302 and a gripper 304.

The rod 302 is configured to be held by a user. The rod 302 extends between a proximal end 302*a* and a distal end 302*b*. The proximal end 302*a* is closer to the cup 102 when the cup 102 is held by the handle 300.

The gripper 304 is joined to the proximal end 302*a* of the rod 300 and shaped to be traversed by a portion of the cup 102 below the ridge 102*a* and to abut the ridge 102*a* from below the ridge. In this manner, the gripper 304 supports the cup 102 by supporting the ridge 102*a*, thereby enabling handling of the cup via the handle 300.

In some embodiments of the present invention the gripper 304 is a closed loop, as shown in FIGS. 8 and 9. In some embodiments of the present invention, the gripper 304 is a has a shape that surrounds around a majority of the cup 102. For example, the gripper 302 may have a gap 306 with width 308 smaller than a dimension (e.g., a diameter, or a side) of the of the cup. In this manner, the cup 102 is sufficiently surrounded by the gripper 302 not to slip from the gripper 302.

FIGS. 16-23 illustrate steps of a method for using the liquid holding assembly, according to some embodiments of the present invention.

Figure 16:
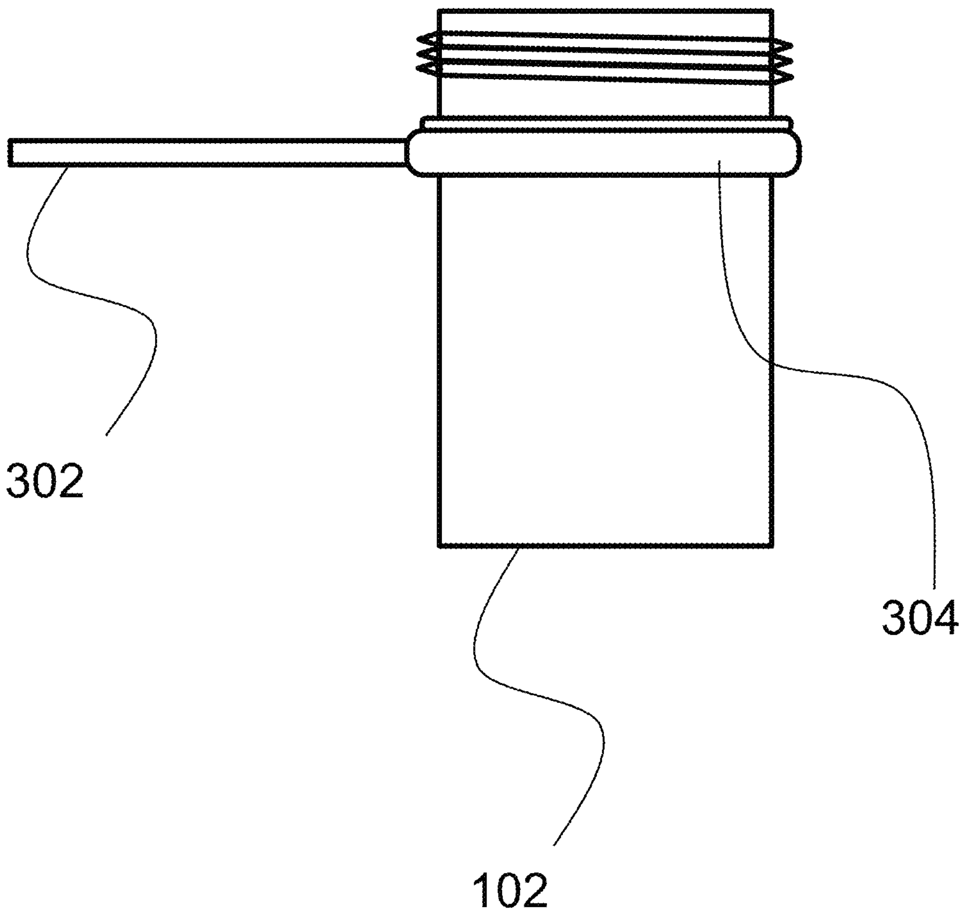
FIGS. 16-23 illustrate steps of a method for using the liquid holding assembly, according to some embodiments of the present invention.

If the assembly includes the handle, in FIG. 16, the cup 102 is placed through the gripper 304. In this manner, the cup be maneuvered by holding the handle 302.

Next, a user deposits urine into the cup 102 without the chamber assembly. In the handle is present, the urine is deposited in the cup by the user while the user holds the rod 302 of the handle. This enables the user to keep the user's hand far enough from the cup 102 while urinating in the cup, thus decreasing the risk of the user soiling the user's hand with urine.

Figure 17:
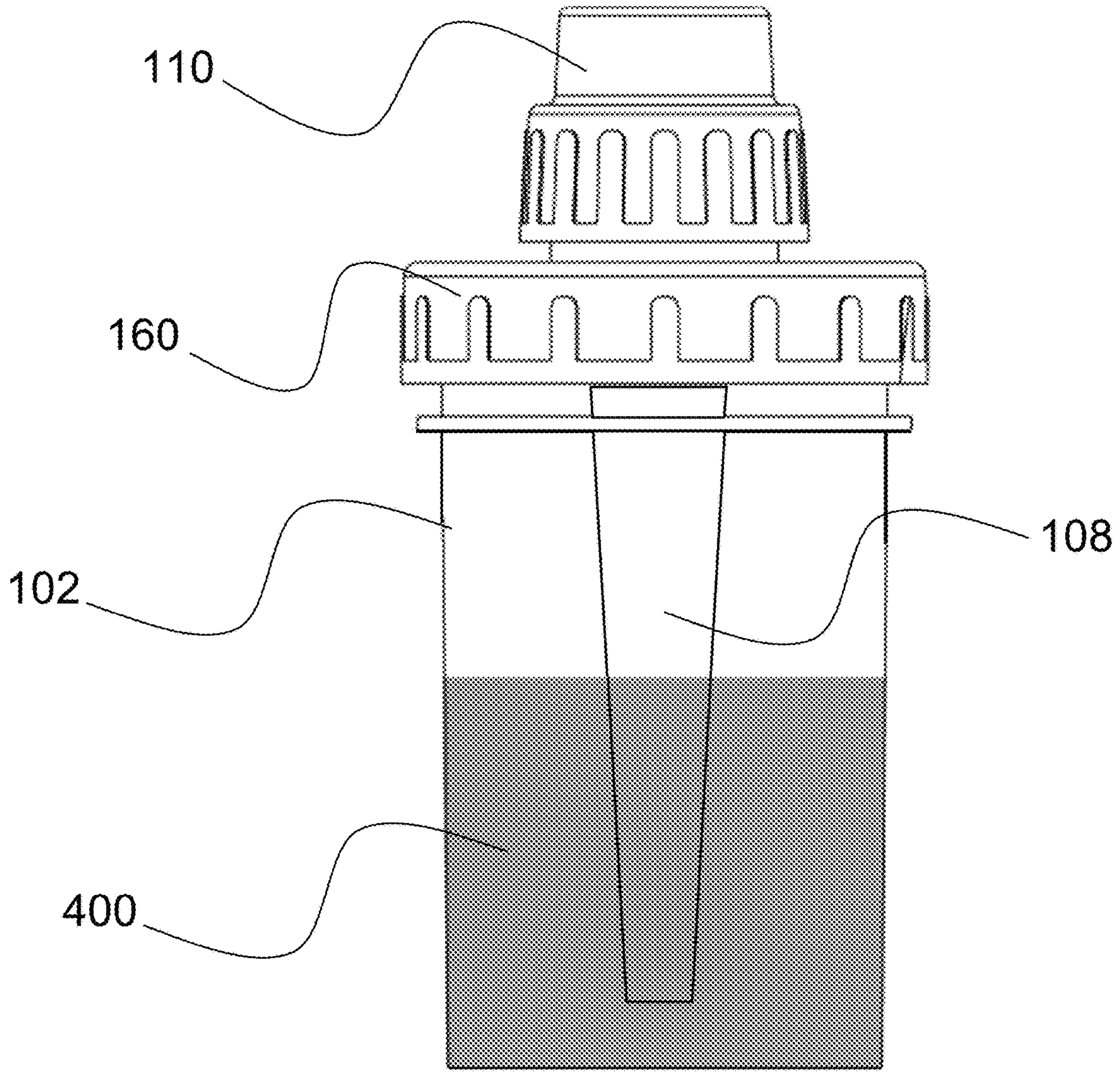

In FIG. 17, after urine 400 is in the cup 102, the chamber assembly (cap 106, chamber 108, and chamber cup 110) is joined to the cup 102.

Figure 18:
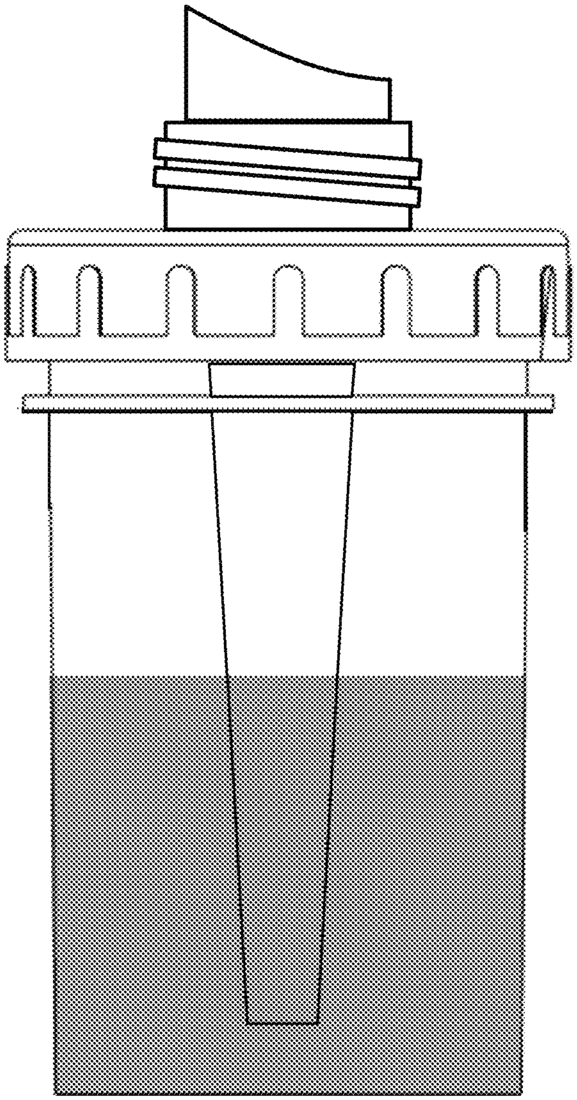

In FIG. 18, the chamber cap is removed from the top assembly, so the top portion of the chamber 108 is left open.

Figure 19:
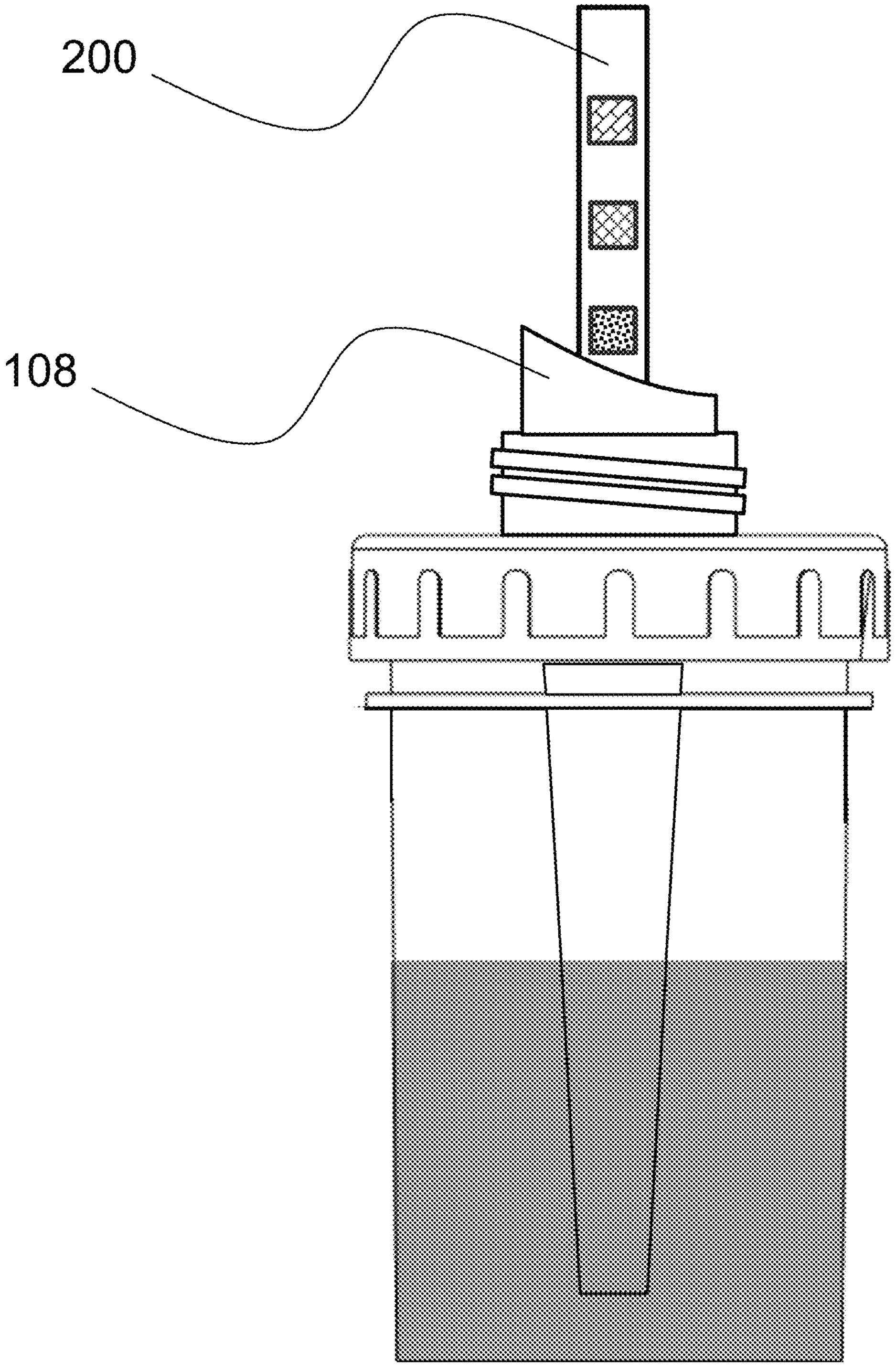

In FIG. 19, the test strip 200 is placed into the chamber 108 which is also partially filled with urine, as urine from the cup flows into the chamber via the opening(s), as explained above.

Figure 20:
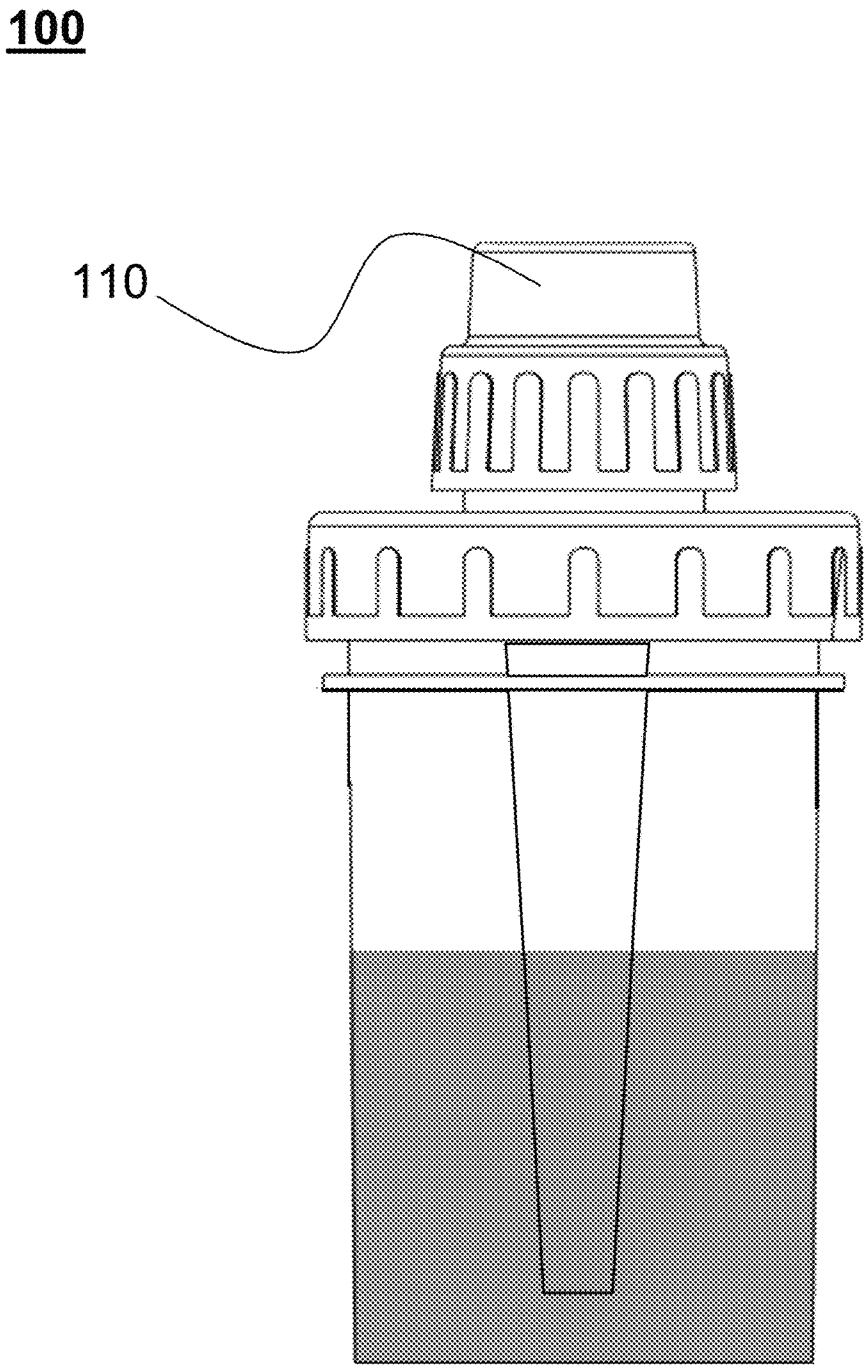

In FIG. 20, the chamber cap 110 is joined to the chamber, thus sealing the chamber 108 containing the test strip is sealed.

Figure 21:
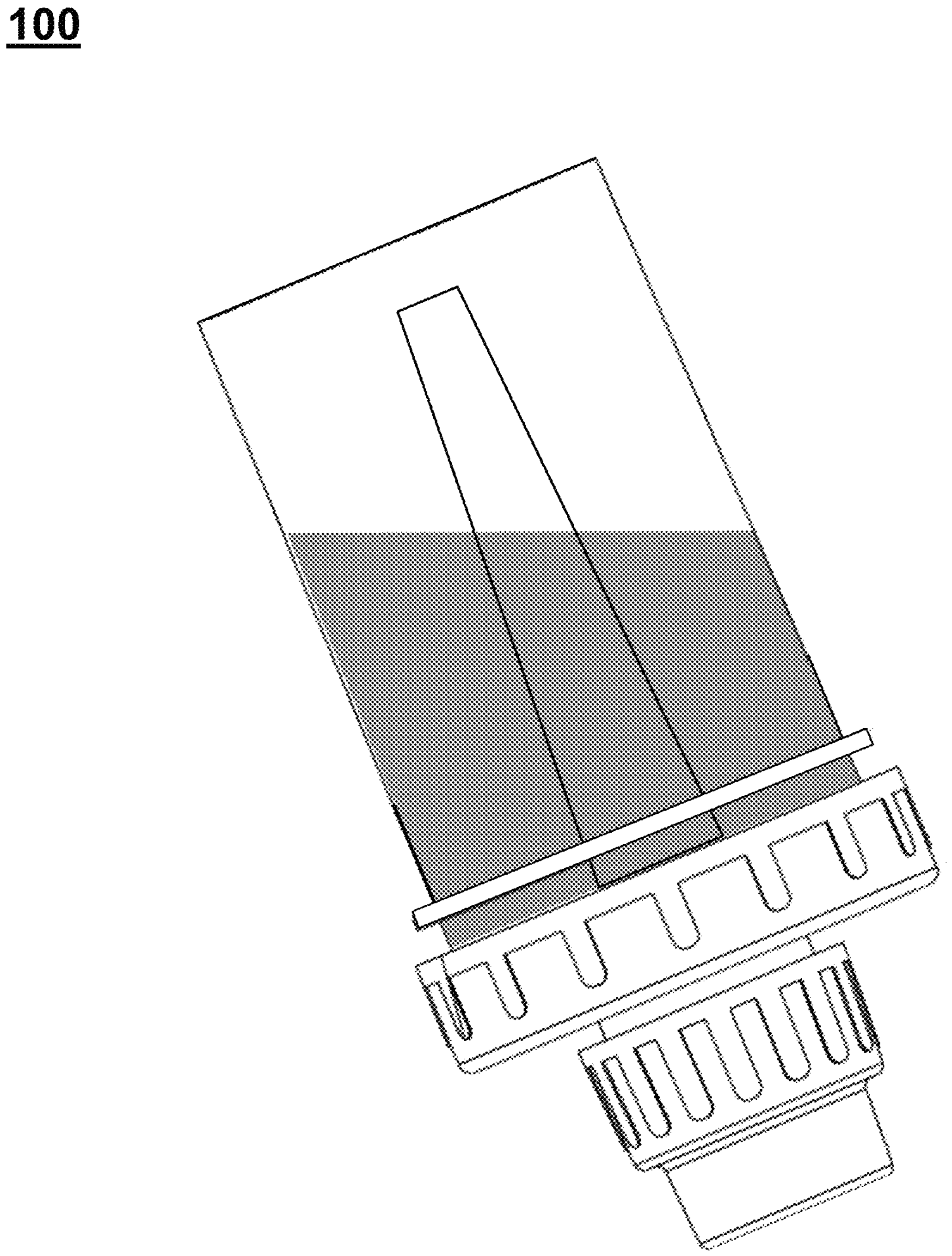

In FIG. 21, the user rotates the entire liquid containing assembly 100 upside down to douse the test strip completely with urine while inside the chamber.

Figure 22:
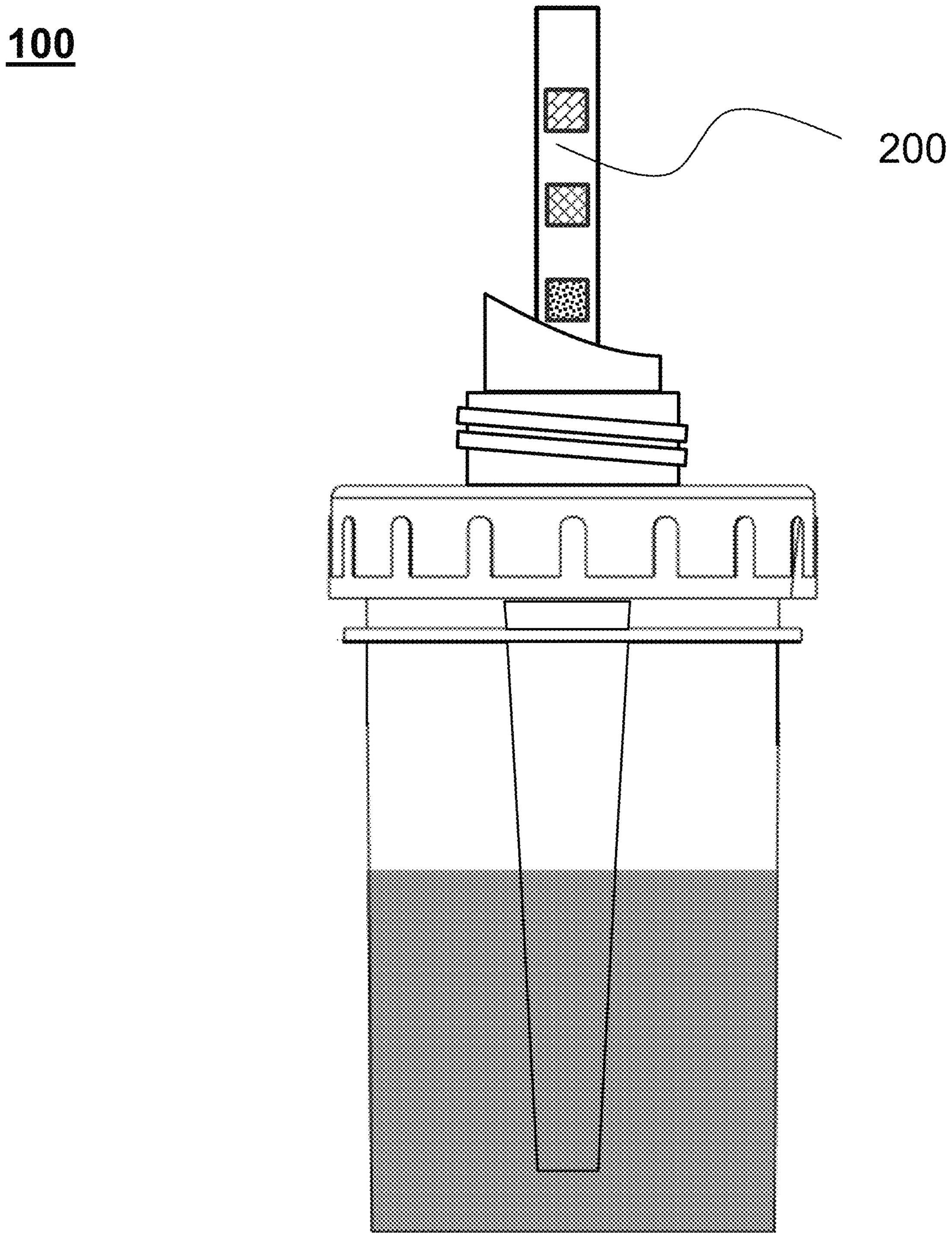
Figure 23:
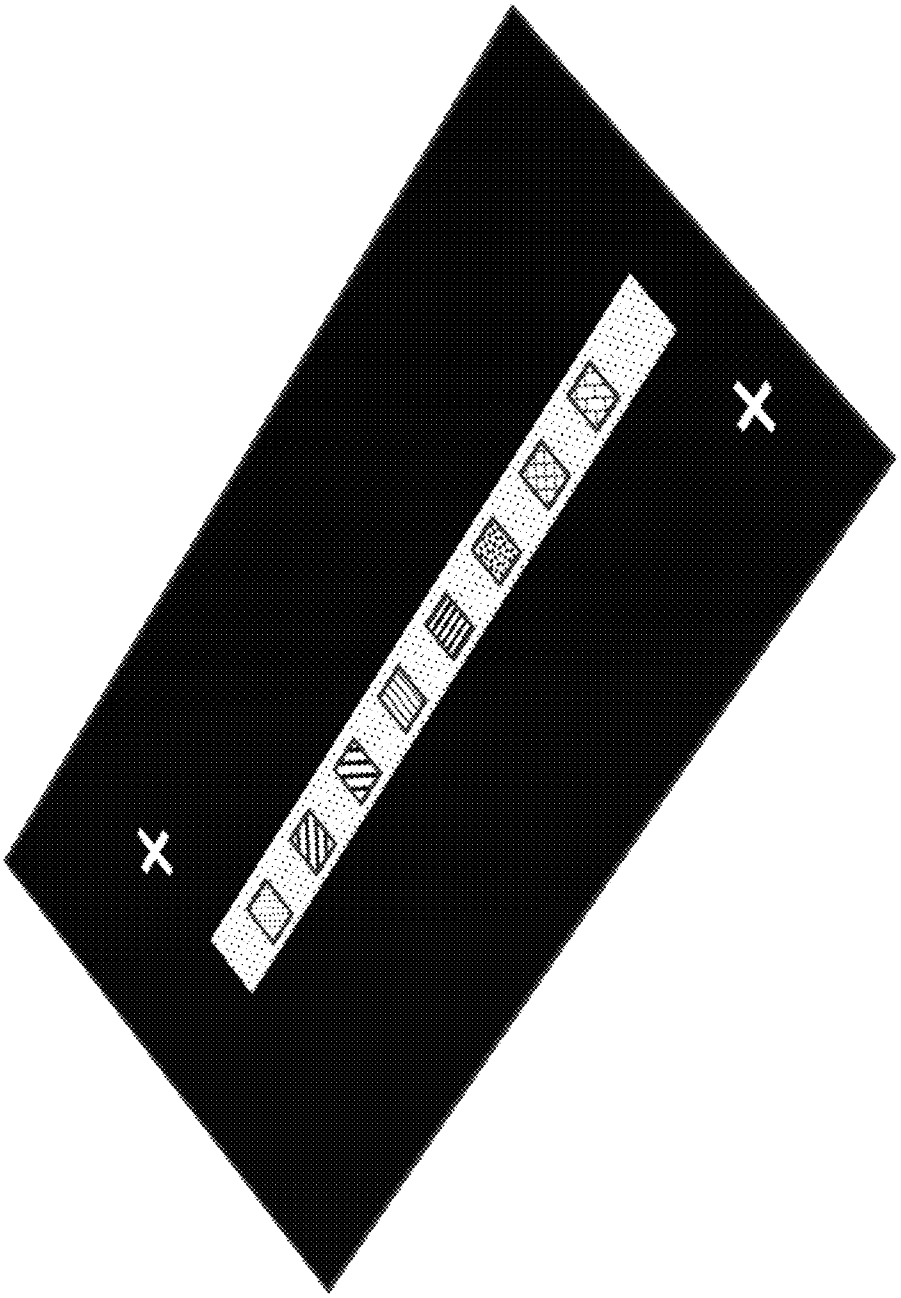

In FIG. 22, the liquid containing assembly 100 is oriented upright and the chamber cap is unscrewed. The test strip 200 is removed for later analysis.

The test strip may be analyzed by being placed on a surface (as in FIG. 23) and scanned by a device and analyzed by a device application.

What is claimed is:

1. An assembly for holding a liquid sample, the assembly comprising:
- (i) a cup for holding a liquid; and
- (ii) a chamber assembly, comprising:
  - a cap configured to be removably joined to the cup and to close the cup when joined to the cup;
  - a chamber joined to the cap and having an open top end above the entire cap, the chamber traversing the cap and extending from the open top end to a bottom end below the cap, such that when the cap is joined to the cup, the bottom end of chamber is located inside the cup, the first chamber having at least one perforation at or near the bottom end;
  - a chamber cap configured to be joined to the open top end of the chamber and to close the chamber when joined to the chamber; and a test strip configured to be placed inside the chamber, such that the test strip is completely held within the chamber in a substantially vertical orientation when the chamber is closed by the chamber cap.

2. The assembly of claim 1, wherein:
- the cup has a ridge at least partially surrounding an outer surface thereof below a rim of the cup;
- the assembly further comprises a handle, which comprises:
  - a rod configured to be held by a user, the rod extending between a proximal end and a distal end; and
  - a gripper joined to the proximal end of the rod and shaped to be traversed by a portion of the cup below the ridge and to abut the ridge from below the ridge, such that the gripper supports the cup by supporting the ridge, thereby enabling handling of the cup via the handle.

3. The assembly of claim 2, wherein the gripper is a loop.

4. The assembly of claim 1, wherein:
- the cup has first threads;
- the cap has second threads configured to cooperate with the first threads;
- the cap is configured to be joined to the cup by being screwed onto the cup so the first threads and the second threads cooperate.

5. The assembly of claim 1, wherein the cap seals the cup when joined to the cup.

6. The assembly of claim 1, wherein the chamber cap seals the chamber when joined to the chamber.

7. The assembly of claim 1, wherein the liquid is urine and the test strip is a urine test strip.

8. A method for testing a liquid, the method comprising:
- providing the assembly of claim 1;
- depositing the liquid in the cup;
- closing the cup with the cap;
- removing the chamber cap from the chamber;
- placing a test strip in the chamber;
- closing the chamber with the chamber cap while the test strip is in the chamber;
- tilting the cup, to douse the test strip with the liquid while inside the chamber;
- orienting the cup upright;
- removing the chamber cap from the chamber;
- removing the test strip.

9. The method of claim 8, further comprising, after the removing of the test strip, analyzing the strip.

10. The method of claim 8, wherein:
- the cup has a ridge surrounding an outer surface thereof below a rim of the cup;
- the assembly further comprises a handle, which comprises:
  - a rod configured to be held by a user, the rod extending between a proximal end and a distal end; and
  - a gripper joined to the proximal end of the rod and shaped to be traversed by a portion of the cup below the ridge and to abut the ridge from below the ridge, such that the gripper supports the cup by supporting the ridge, thereby enabling handling of the cup via the handle;
- before the depositing of the liquid in the cup, the method comprises:
  - placing the cup through the gripper, such that the gripper abuts the ridge from below;
  - maneuvering the cup by holding and moving the rod.

11. The method of claim 8, wherein the liquid is urine and the test strip is a urine test strip.

12. An assembly for holding a liquid sample, the assembly comprising:
- (i) a cup for holding a liquid, the cup having a ridge at least partially surrounding an outer surface thereof below a rim of the cup;
- (ii) a chamber assembly, comprising:
  - a cap configured to be removably joined to the cup and to close the cup when joined to the cup;
  - a chamber joined to the cap and having an open top end above the cap, the chamber traversing the cap and extending from the open top end to a bottom end below the cap, such that when the cap is joined to the cup, the bottom end of chamber is located inside the cup, the first chamber having at least one perforation at or near the bottom end;

a chamber cap configured to be joined to the open top end of the chamber and to close the chamber when joined to the chamber;

(iii) a handle, which comprises:

a rod configured to be held by a user, the rod extending between a proximal end and a distal end; and a gripper joined to the proximal end of the rod and shaped to be traversed by a portion of the cup below the ridge and to abut the ridge from below the ridge, such that the gripper supports the cup by supporting the ridge, thereby enabling handling of the cup via the handle;

and (iv) a test strip configured to be placed inside the chamber, such that the test strip is completely held within the chamber in a substantially vertical orientation when the chamber is closed by the chamber cap.

13. The assembly of claim 12, wherein the liquid is urine and the test strip is a urine test strip.

* * * * *